(12) United States Patent
Yamaguchi (10) Patent No.: US 9,784,377 B2
(45) Date of Patent: Oct. 10, 2017

(54) CHECK VALVE

(71) Applicant: PIOLAX, INC., Yokohama-shi (JP)

(72) Inventor: Kosei Yamaguchi, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 37 days.

(21) Appl. No.: 14/878,101

(22) Filed: Oct. 8, 2015

(65) Prior Publication Data
US 2016/0101684 A1 Apr. 14, 2016

(30) Foreign Application Priority Data

Oct. 10, 2014 (JP) ................. 2014-209261

(51) Int. Cl.
| | |
|---|---|
| F16K 15/02 | (2006.01) |
| F16K 17/196 | (2006.01) |
| F16K 24/04 | (2006.01) |
| F16K 24/06 | (2006.01) |
| F16K 27/02 | (2006.01) |

(52) U.S. Cl.
CPC .......... *F16K 15/025* (2013.01); *F16K 15/026* (2013.01); *F16K 17/196* (2013.01); *F16K 24/04* (2013.01); *F16K 24/06* (2013.01); *F16K 27/0209* (2013.01)

(58) Field of Classification Search
CPC .... F16K 15/025; F16K 11/10; F16K 17/0473; Y10T 137/3646; Y10T 137/778; Y10T 137/7771–137/7773
USPC ................. 137/226, 493.2, 493.9, 493.1, 493
See application file for complete search history.

(56) References Cited

U.S. PATENT DOCUMENTS

| | | | | |
|---|---|---|---|---|
| 2,679,946 A | * | 6/1954 | Friend ................ | B60K 15/0406 137/493.9 |
| 3,047,235 A | * | 7/1962 | Eshbaugh ............ | F01P 11/0238 137/493.2 |
| 3,179,122 A | * | 4/1965 | Wasdell .................. | F16F 9/348 137/454.5 |
| 4,109,674 A | * | 8/1978 | Beale ...................... | F16K 17/19 137/493.9 |
| 4,805,663 A | * | 2/1989 | Szlaga ................. | G05D 7/0106 137/493.2 |

(Continued)

FOREIGN PATENT DOCUMENTS

JP        S 62-037677 U     3/1987

OTHER PUBLICATIONS

United Kingdom Search Report dated Mar. 10, 2010.

*Primary Examiner* — Mary McManmon
*Assistant Examiner* — Nicole Gardner
(74) *Attorney, Agent, or Firm* — McGinn IP Law Group, P.L.L.C.

(57) ABSTRACT

An embodiment provides a check valve including a valve case, a positive pressure valve having a resin ring sealing member, and a resin negative pressure valve. The positive pressure valve and the negative pressure valve are disposed in the valve case. The positive pressure valve includes a first mount surface and a second mount surface disposed on an inner diameter side of the first mount surface. In the valve case, a presser cap is mounted on the positive pressure valve so as to sandwich the ring sealing member and the negative pressure valve with the first mount surface and the second mount surface of the positive pressure valve.

11 Claims, 10 Drawing Sheets

(56) References Cited

U.S. PATENT DOCUMENTS

| | | | | |
|---|---|---|---|---|
| 4,922,954 | A | * | 5/1990 | Blomquist ....... B60K 15/03519 137/493 |
| 5,479,978 | A | * | 1/1996 | Zenkich ............. B60K 15/0406 137/469 |
| 5,499,654 | A | * | 3/1996 | Shefte .................... B65D 51/16 137/493.9 |
| 6,196,258 | B1 | * | 3/2001 | Araki ............... B60K 15/03504 137/493.4 |
| 6,929,025 | B2 | * | 8/2005 | Sato ...................... F16K 17/196 137/493.6 |
| 2005/0092364 | A1 | | 5/2005 | Furuya et al. |
| 2011/0226356 | A1 | | 9/2011 | Yamaguchi |

* cited by examiner

CHECK VALVE

CROSS-REFERENCE TO RELATED APPLICATION(S)

This application claims priority from Japanese Patent Application No. 2014-209261 filed on Oct. 10, 2014, the entire contents of which are incorporated herein by reference.

FIELD

The present invention relates to a check valve for regulating the pressure within a fuel tank of an automobile or the like.

BACKGROUND

A check valve may be mounted on a fuel tank of an automobile or the like to prevent a fuel tank from bursting or the like by discharging fuel vapor to an outside when the pressure within the fuel tank rises to a positive-pressure threshold or higher, while it also prevents the fuel tank from being crushed or the like by taking outside air flow into the fuel tank from the outside thereof when the pressure within the fuel tank drops to a negative-pressure threshold lower than the atmospheric pressure.

JP-UM-S62-037677-A discloses from the third page, line 11 to the fourth page, line 6, and FIG. 2, a check valve assembly including a cup-shaped tubular body including a connection port connected to its one end on a tank side, and a connection port connected to the other end on a canister side, an operation cylinder having the H-like cross section, which is disposed slidably inside of the tubular body, a partition wall with a hole, which is disposed in the middle in the shaft direction of the operation cylinder, an umbrella valve (mushroom valve) made of rubber that is mounted on the partition wall and arranged to close the hole in a normal state, a cylindrical frame arranged to fit into the other opening of the operation cylinder, a cylindrical valve made of rubber mounted on the cylindrical frame, and a coil spring arranged to urge the operation cylinder toward the connection port on the canister side.

In the normal state of the check valve assembly, the operation cylinder is urged by the coil spring and the cylindrical valve closes the connection port on the canister side. When the tank internal pressure rises, however, the umbrella valve is pressed and deformed so as to open the hole in the partition wall and discharge the fuel vapor or the like to the canister side. On the other hand when the tank internal pressure drops, the operation cylinder is pressed against the urging force of the coil spring so that the cylindrical valve opens the connection port on the canister side to take the outside air flow into the tank.

However, in JP-UM-S62-037677-A, the umbrella valve needs to be mounted by inserting a shaft portion thereof into a mounting hole in the center of the partition wall of the operation cylinder that slides in the cup-shaped tubular body. On top of this, the cylindrical valve needs to be mounted by inserting a shaft portion thereof into the mounting hole of the cylindrical frame that is fitted into the other end of the operation cylinder. These assembling works are complicated and cumbersome, which arises problems in assembly workability.

SUMMARY

One object of the present invention is to provide a check valve capable of improving assembly workability in a valve including a positive pressure valve and a negative pressure valve.

An aspect of the present invention provides a check valve including:
 a valve case including
  a first connection portion connectable with a pipe communicating with a fuel tank,
  a second connection portion connectable with a pipe communicating with a canister disposed outside of the fuel tank,
  a valve chamber defined in an interior of the valve case, and
  a positive pressure valve seat formed at a portion within a range from the valve chamber to the first connection portion;
 a positive pressure valve slidably disposed in the valve chamber so as to close or open the positive pressure valve seat, the positive pressure valve including
  a penetrating passage penetrating inside the positive pressure valve, and
  a negative pressure valve seat disposed around an opening portion of the penetrating passage at a side of the first connection portion;
 a spring disposed in the valve case, and arranged to urge the positive pressure valve so as to be brought into contact with the positive pressure valve seat, and to be compressed so as to open the positive pressure valve from the positive pressure valve seat when a pressure at the side of the first connection portion rises to a positive-pressure threshold or higher; and
 a negative pressure valve made from an elastic resin material, assembled to the positive pressure valve, and arranged to be brought into elastic contact with the negative pressure valve seat so as to close the penetrating passage in a normal state, and to open the penetrating passage when the pressure at the side of the first connection portion drops to a negative-pressure threshold or lower,
  wherein the positive pressure valve includes
   a valve main body, and
   a ring sealing member assembled to the valve main body, made from an elastic resin material, and arranged to close or open the positive pressure valve seat,
  wherein the valve main body includes
   a first mount surface on which the ring sealing member is mounted, and
   a second mount surface which is disposed on an inner diameter side of the first mount surface, on which the negative pressure valve seat is formed, and on which the negative pressure valve is mounted, and
  wherein a presser cap is further mounted on the positive pressure valve, so that the presser cap sandwiches the ring sealing member with the first mount surface of the valve main body and sandwiches the negative pressure valve with the second mount surface of the valve main body.

There may be provided, based on the above configuration, the check valve,
 wherein the second mount surface of the valve main body includes a shaft insertion hole in its center,
 wherein the negative pressure valve has a ring shape, and
 wherein the presser cap includes
  a shaft portion inserted into the shaft insertion hole,
  a presser portion disposed on an outer periphery of a base end of the shaft portion, and arranged to sandwich the ring sealing member and the negative pressure valve with the first mount surface and the second mount surface, respectively, and an engaging portion arranged to engage the shaft portion with a back surface of the shaft insertion hole.

There may be provided, based on the above configuration, the check valve, wherein each of the ring sealing member and the negative pressure valve includes a thick portion on its inner periphery side, and a thin portion on its outer diameter side than the thick portion, the thin portion being thinner than the thick portions, wherein the presser cap is arranged to sandwich the thick portion of the ring sealing member and the thick portion the negative pressure valve with the first mount surface and the second mount surface of the valve main body, respectively, and wherein a predetermined gap is defined between the thin portion of the ring sealing member and the first mount surface of the valve main body in a state where the positive pressure valve slides against an urging force of the spring and the positive pressure valve seat is opened.

There may be provided, based on the above configuration, the check valve, wherein a ring convex portion is formed on the first mount surface such that the ring convex portion is brought into contact with the thin portion of the ring sealing member, thereby supporting the thin portion of the ring sealing member with the predetermined gap from the first mount surface of the valve main body.

There may be provided, based on the above configuration, the check valve, wherein the negative pressure valve seat includes a ring rib formed on the second mount surface of the valve main body so as to surround the opening portion of the penetrating passage at the side of the first connection portion.

According to the above configuration, because the ring sealing member is disposed on the first mount surface of the valve main body constituting the positive pressure valve, the negative pressure valve is disposed on the second mount surface of the valve main body, and the presser cap is mounted on the positive pressure valve, the ring sealing member and the negative pressure valve can be sandwiched with both the mount surfaces. Thus, assembly workability of the ring sealing member and the negative pressure valve with respect to the positive pressure valve can be improved.

While in the normal state the ring sealing member of the positive pressure valve is brought into contact with the positive pressure valve seat by the spring and the negative pressure valve is brought into contact with the negative pressure valve seat to close the passage communicating the inside of the fuel tank with the outside, the positive pressure valve slides against the urging force of the spring to move away from the positive pressure valve seat when the pressure inside the fuel tank rises to a positive-pressure threshold or higher, and the fuel vapor or the like in the tank is discharged to the canister through the positive pressure valve seat, which can prevent the pressure inside the tank from rising to the positive-pressure threshold or higher. Meanwhile, when the pressure inside the fuel tank drops to a negative-pressure threshold or lower, the negative pressure valve, which is brought into elastic contact with the negative pressure valve seat in the normal state, moves apart so as to curl up from the negative pressure valve seat, and the air or the like outside of the fuel tank flows into the fuel tank through the negative pressure valve seat, which can prevent the pressure inside the fuel tank from dropping to the negative-pressure threshold or lower.

The ring sealing member made from an elastic resin material that is mounted on the first mount surface of the positive pressure valve is arranged to be brought into contact with to seal the positive pressure valve seat, which can improve the sealing property of the positive pressure valve with respect to the positive pressure valve seat.

BRIEF DESCRIPTION OF DRAWINGS

FIGS. 2A and 2B are views showing a valve main body constituting the check valve.

FIGS. 3A and 3B are views showing a presser cap constituting the check valve.

DETAILED DESCRIPTION

Hereinafter, a check valve according to one embodiment will be described with reference to FIGS. 1 to 9.

As shown in FIG. 1 to FIG. 4, this check valve 10 includes a valve case 20 including a case main body 30 and a sub case 40, the valve case 20 having its interior defining a valve chamber V (see FIG. 4), a positive pressure valve 50 including a valve main body 60 and a ring sealing member 75 and housed to be slidable in the valve chamber V, a spring 53 arranged to urge the positive pressure valve 50 so as to bring the positive pressure valve 50 into contact with a positive pressure valve seat 37 (FIG. 4), a negative pressure valve 55 that is assembled to the positive pressure valve 50, and a presser cap 80 mounted on the pressure valve 50.

Figure 1:
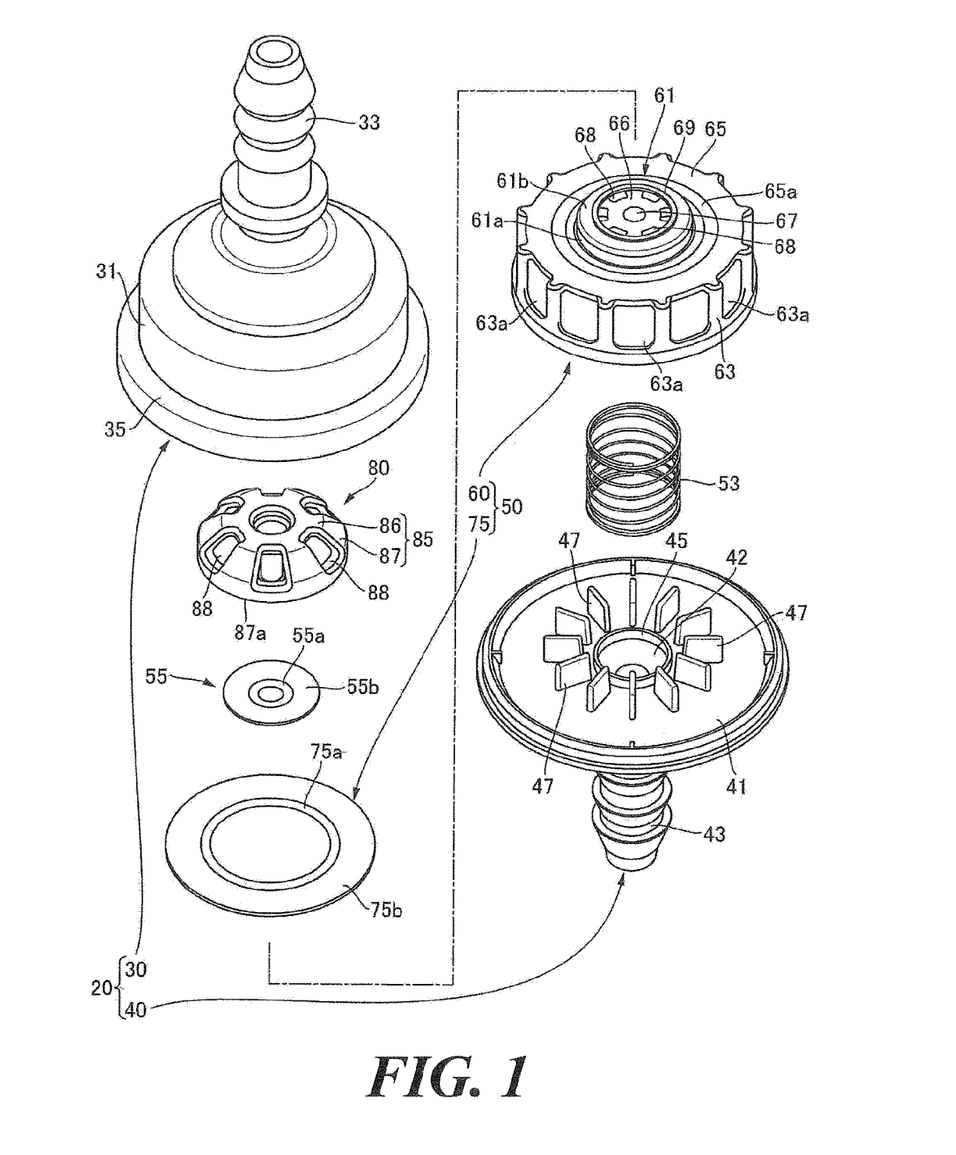
FIG. 1 is an exploded perspective view of a check valve according to one embodiment.

As shown in FIG. 1, the case main body 30 includes a cylinder body 31 having a circular cylindrical shape opened at one end, and a first connection portion 33 having a cylindrical shape extending from the other end of the cylinder body 31 so as to communicate with the interior of the cylinder body 31. A pipe (not shown) communicating with a fuel tank is connected with the first connection portion 33. A positive pressure valve seat 37 having a ring rib shape is provided protruding at a portion within a range from the valve chamber V to the first connection portion 33 on the inner periphery of the cylinder body 31 (see FIG. 4). The positive pressure valve 50 closes or opens the positive pressure valve seat 37. A ring flange portion 35 used for assembling with the sub case 40 is provided to the cylinder body 31 on a peripheral edge on the opening side.

The sub case 40 includes a lid body 41 having a disk shape that includes an opening portion 42 in its center that communicates with the exterior of the fuel tank. The sub casing 40 is assembled to the case main body 30 by joining, for example, by welding the outer periphery of the lid body 41 to the ring flange portion 35 of the case main body 30.

A second connection portion 43 having a cylindrical shape extends from the peripheral edge on the outer surface side of the opening portion 42 of the lid body 41. A pipe (not illustrated) communicating with a canister disposed outside of the fuel tank is connected with the second connection portion 43.

A spring supporting seat 45 having a ring shape arranged to support one end of the spring 53 protrudes from the peripheral edge of the opening portion 42 on the inner surface side of the lid body 41. Plural ribs 47 protrude at regular intervals in a radial fashion around the center of the lid body 41 on the outer periphery of the spring supporting seat 45. A fuel vapor, air, or the like circulates between the adjacent ribs 47 and 47.

Next, the positive pressure valve 50 including the valve main body 60 and the ring sealing member 75 will be described.

Figure 2A:
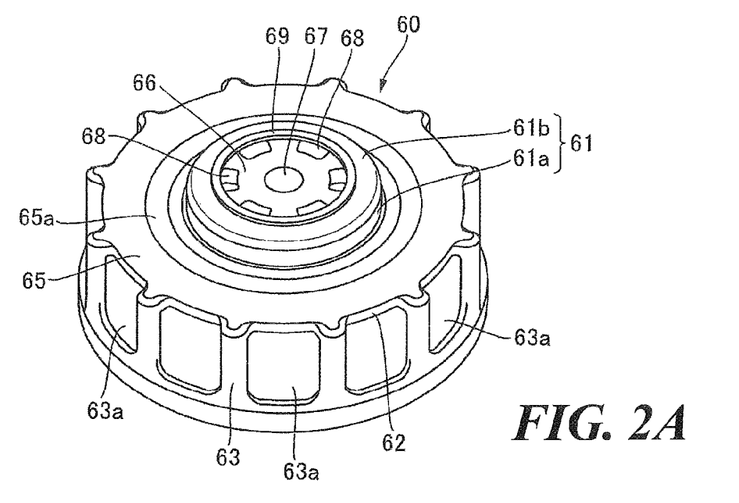
FIG. 2A is a perspective view of the valve main body.
Figure 2B:
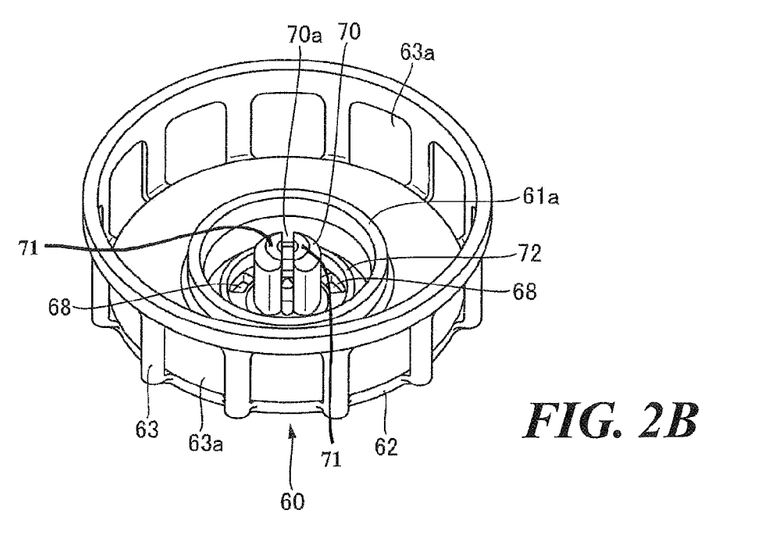
FIG. 2B is a perspective view of the valve main body seen in a direction different from FIG. 2A.
Figure 4:
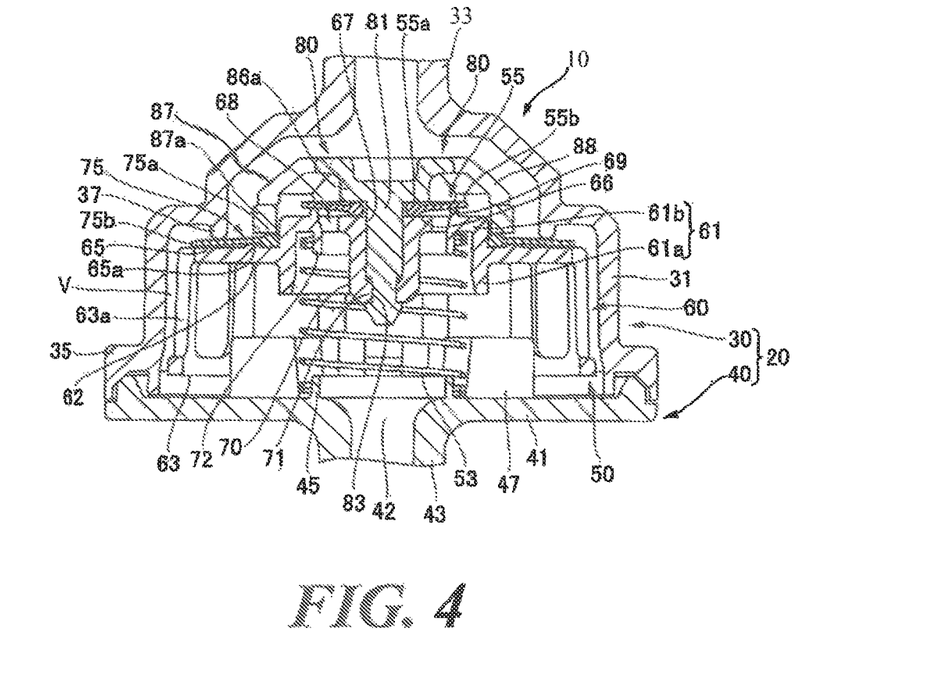
FIG. 4 is an enlarged cross-sectional view of the check valve showing a relevant part in a state where the pressure within the fuel tank is normal.

As shown in FIGS. 2A and 2B and FIG. 4, the valve main body 60 constituting the positive pressure valve 50 includes a base portion 61 opened at the bottom portion and including a peripheral wall 61a having a circular cylindrical shape and a ceiling wall 61b disposed at the opening above the peripheral wall 61a. A flange portion 62 having a ring shape and expanding in the outer diameter direction is provided on the peripheral wall 61a of the base portion 61 from the outer periphery in the middle in the shaft direction. A frame-shaped wall 63 including plural window portions 63a along the circumferential direction is provided to the flange portion 62 so as to extend vertically from the outer peripheral edge.

The outer surface side (right side) of the flange portion 62 defines a first mount surface 65 on which the ring sealing member 75 is mounted. A ring convex portion 65a having a ring shape is provided to the first mount surface 65 so as to protrude from a position away a predetermined gap from the peripheral wall 61a of the base portion 61.

Figure 7:
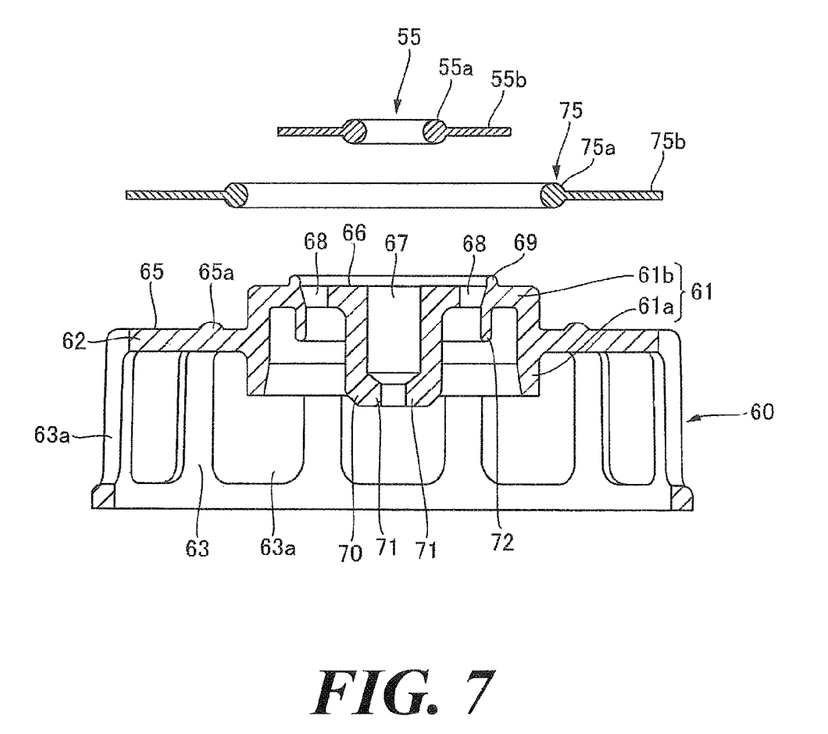
FIG. 7 is an explanatory view showing a first process of assembling the ring sealing member and the negative pressure valve to the valve main body constituting the positive pressure valve in the check valve.

As shown in FIG. 1 and FIG. 7, the ring sealing member 75 includes a thick portion 75a having a ring shape on its inner side, and a thin portion 75b having a thin lip shape that is thinner than the thick portion 75a and extends in the outer diameter direction from the peripheral edge of the thick portion 75a. The inner diameter of the thick portion 75a of the ring sealing member 75 is larger than the outer diameter of the peripheral wall 61a of the base portion 61 (see FIG. 7). The ring sealing member 75 is made from an elastic resin material such as rubber and an elastomer.

Figure 5:
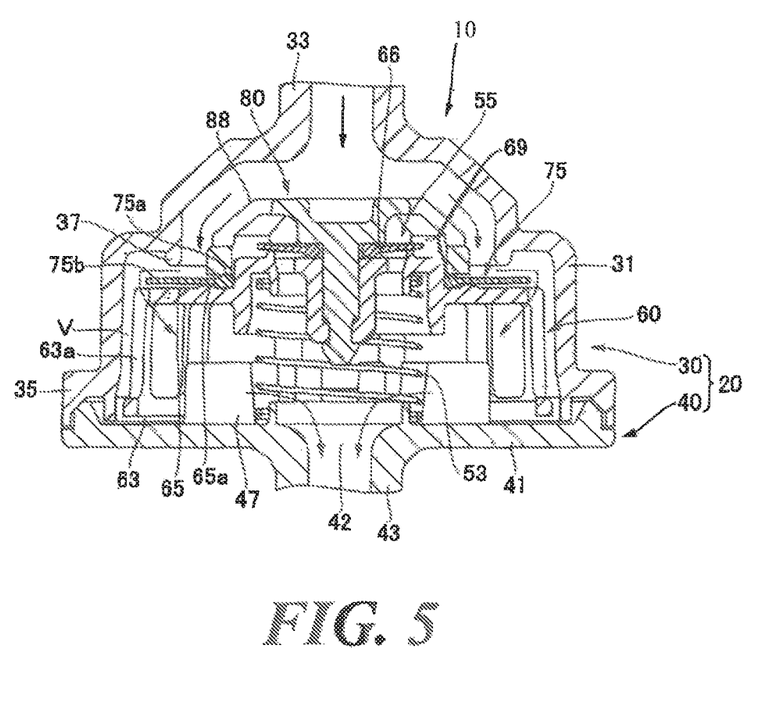
FIG. 5 is an enlarged cross-sectional view of the check valve showing a relevant part in a state where the pressure within the fuel tank reaches a positive-pressure threshold or higher.

By inserting the base portion 61 of the valve main body 60 into the inner periphery of the thick portion 75a of the ring sealing member 75, the ring sealing member 75 is mounted on the first mount surface 65. In the present embodiment, the thick portion 75a of the ring sealing member 75 is mounted on the first mount surface 65 while the ring convex portion 65a is brought into contact with the back surface of the thin portion 75b of the ring sealing member 75. Thus, the thin portion 75b is made apart with respect to the first mount surface 65 via a predetermined gap in a state where the positive pressure valve 50 slides against the urging force of the spring 53, whereby the positive pressure valve seat 37 is opened as shown in FIG. 5 (see also FIG. 8). When the thin portion 75b is made sufficiently apart from the first mount surface 65 by the thick portion 75a, the ring convex portion 65a is not indispensable.

Referring back to the description of the positive pressure valve 50 again, the ceiling wall 61b constituting the base portion 61 is disposed on the inner diameter side of the first mount surface 65, a negative pressure valve seat 69 to be described later is provided on the outer surface side (right side) of the ceiling wall 61b, and the ceiling wall 61b defines the second mount surface 66 on which the negative pressure valve 55 is mounted.

A shaft insertion hole 67 is provided in the center of the ceiling wall 61b on which the second mount surface 66 is provided. A shaft portion 81 (see FIG. 3B) to be described later is inserted into the shaft insertion hole 67 (see FIG. 9). Plural penetrating passages 68 communicating the interior and the exterior of the positive pressure valve 50 are provided on the outer periphery of the shaft insertion hole 67 of the ceiling wall 61b of the base portion 61 along the circumferential direction.

As shown in FIG. 2A and FIG. 4, a rib having a ring shape projects at the outer periphery of the plural penetrating passages 68 on the second mount surface 66 so as to surround the opening portions of the plural penetrating passages 68 at the fuel tank side. The rib defines the negative pressure valve seat 69. The negative pressure valve 55 closes or opens the negative pressure valve seat 69 to thereby close and open the plural penetrating passages 68.

Figure 8:
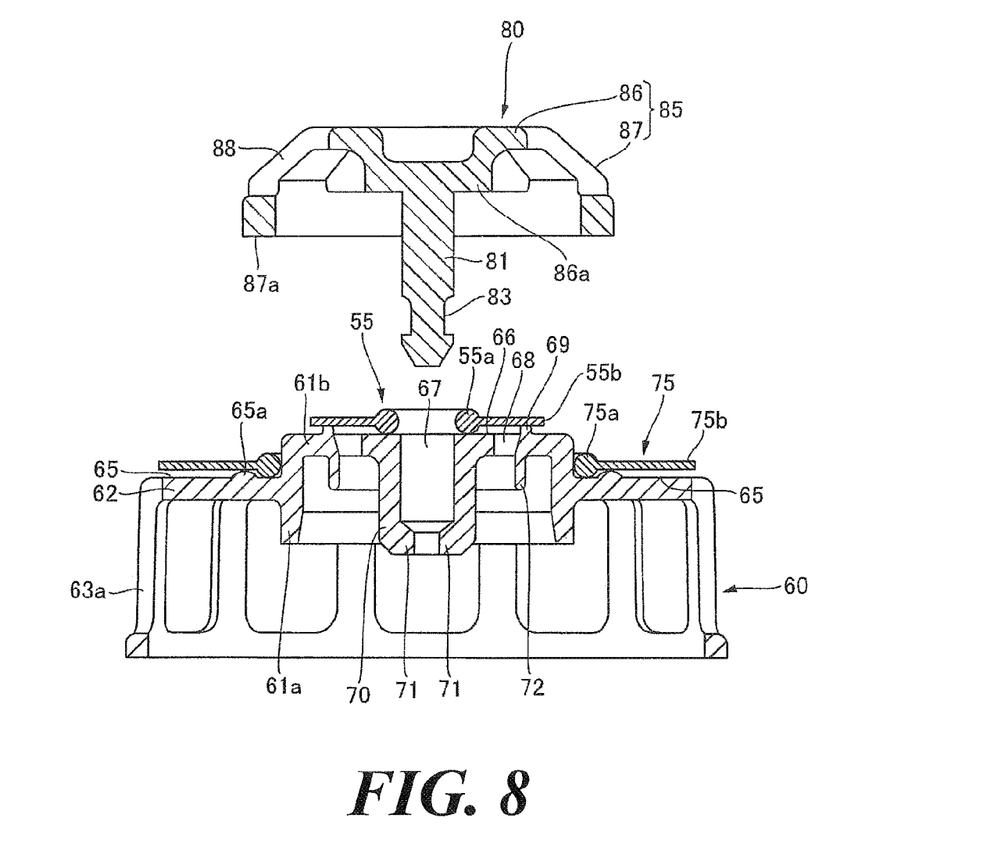
FIG. 8 is an explanatory view showing a second process of assembling the ring sealing member and the negative pressure valve to the valve main body constituting the positive pressure valve in the check valve.

As shown in FIG. 1 and FIG. 7, the negative pressure valve 55 of the present embodiment has a ring shape same as the ring sealing member 75. A thick portion 55a is provided on the inner side of the negative pressure valve 55, and a thin portion 55b having a thin lip shape that is thinner than the thick portion 55a and extends in the outer diameter direction from the peripheral edge of the thick portion 55a is provided to the negative pressure valve 55. The inner diameter of the thick portion 55a is larger than the outer diameter of the shaft portion 81 to be described later of the presser cap 80, and the thin portion 55b is larger than the outer diameter of the negative pressure valve seat 69 as shown in FIG. 8. The negative pressure valve 55 is made from an elastic resin material such as rubber and an elastomer. While the negative pressure valve 55 of the present embodiment has a ring shape, the negative pressure valve 55 may have a simple thin plate shape or the like that includes no hole inside, and the shape of the negative pressure valve 55 is not limited specifically.

The thick portion 55a of the negative pressure valve 55 is mounted on the second mount surface 66 of the valve main body 60, and the outer peripheral edge of the thin portion 55b is brought into elastic contact with the negative pressure valve seat 69 to close the plural penetrating passages 68 in a normal state (see FIG. 4). The negative pressure valve 55 is arranged to move away from the negative pressure valve seat 69 to open the plural penetrating passages 68 when the internal pressure inside the fuel tank drops to a negative-pressure threshold or lower (see FIG. 6).

Figure 9:
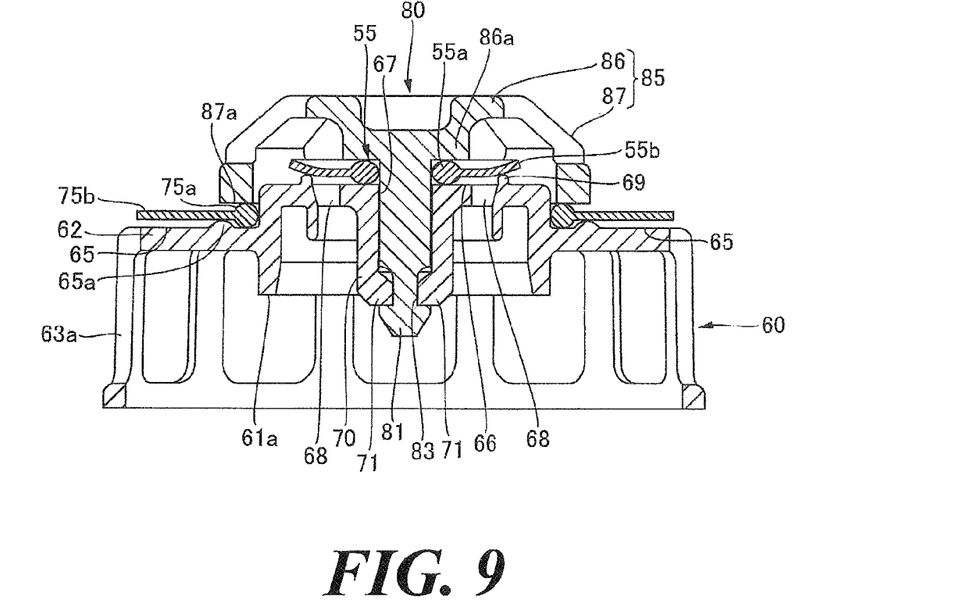
FIG. 9 is an explanatory view showing a state where the ring sealing member and the negative pressure valve are assembled to the valve main body constituting the positive pressure valve in the check valve.

Referring back to the description of the positive pressure valve 50 again, an engaging cylinder portion 70 having an approximately circular cylindrical shape that is split in two via a slit 70a extends from the periphery edge on the back side of the shaft insertion hole 67 that is the inner surface side (back side) of the ceiling wall 61b of the base portion 61 as shown in FIG. 2B. The inner surface of the engaging cylinder portion 70 has the shape of a curved surface. Engaging convex portions 71 and 71 are provided at the opposed positions on the inner side of the distal end of the engaging cylinder portion 70 as shown in FIG. 4 and FIG. 9. The engaging convex portions 71 and 71 are arranged to engage an engaging concave portion 83 of the shaft portion 81 to be described later of the presser cap 80. The engaging cylinder portion may be split in three or four, and the shape of the engaging cylinder portion is not specifically limited.

A spring supporting wall 72 for supporting the other end of the spring 53 projects from the peripheral edge of the plural penetrating passages 68 on the inner surface side of the ceiling wall 61b of the base portion 61 (see FIG. 2B and FIG. 4).

The spring 53 has a configuration such that one end of the spring 53 is supported by the spring supporting seat 45 of the lid body 41 of the sub case 40 while the other end is inserted into the base portion 61 of the valve main body 60 to be supported by the spring supporting wall 72, and the spring 53 is disposed compressed between the lid body 41 and the bottom portion of the sub case 40 and the positive pressure valve 50 in the valve case 20 as shown in FIG. 4. As a result, the positive pressure valve 50 is urged so as to be brought into contact with the positive pressure valve seat 37 of the valve case 20, and the thin portion 75b of the ring sealing member 75 mounted on the first mount surface 65 of the positive pressure valve 50 is brought into contact with the positive pressure valve seat 37 in the normal state (see FIG. 4). The spring 53 is compressed when the pressure inside the fuel tank rises to a positive-pressure threshold or higher and the positive pressure valve 50 is pressed by the fuel vapor or the like, and thus the positive pressure valve 50 slides in the valve chamber V, and the thin portion 75b of the ring sealing member 75 moves away from the positive pressure valve seat 37 to open the opening on the inner side of the positive pressure valve seat 37 (see FIG. 5).

The presser cap 80 is mounted to the positive pressure valve 50 so as to sandwich the ring sealing member 75 with the first mount surface 65 of the valve main body 60, and so as to sandwich the negative pressure valve 55 with the second mount surface 66 of the valve main body 60.

Figure 3A:
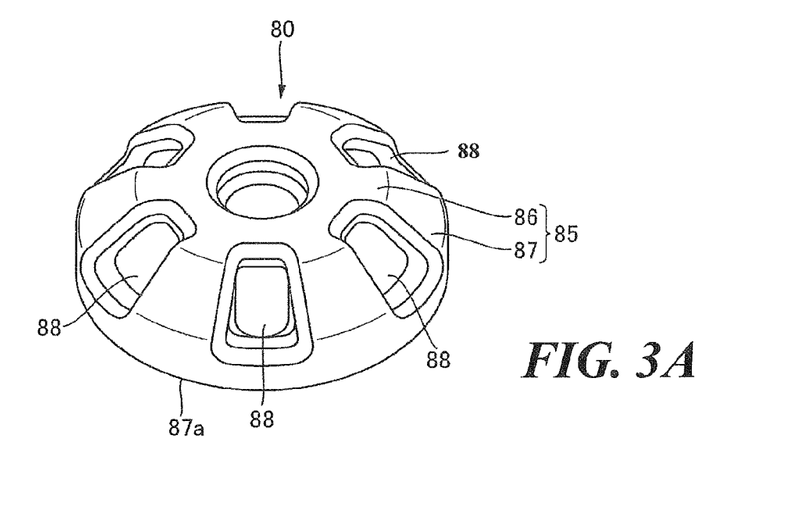
FIG. 3A is a perspective view of the presser cap.
Figure 3B:
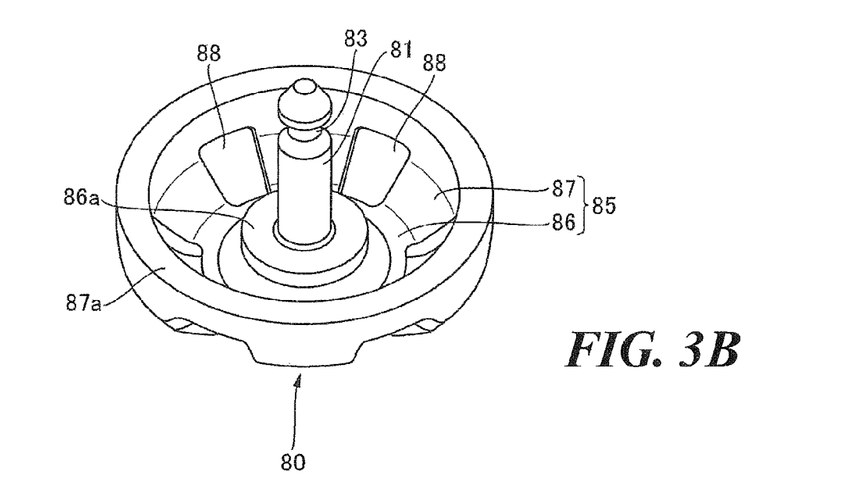
FIG. 3B is a perspective view of the presser cap seen in a direction different from FIG. 3A.

Referring also to FIGS. 3A and 3B, the presser cap 80 of the present embodiment includes the shaft portion 81 inserted into the shaft insertion hole 67 of the valve main body 60 of the positive pressure valve 50, and a presser portion 85 consecutively connected with the outer periphery at the base end of the shaft portion 81, and arranged to sandwich the ring sealing member 75 and the negative pressure valve 55 with the first mount surface 65 and the second mount surface 66, respectively.

As shown in FIG. 3B, the shaft portion 81 has a tapered surface shape at its distal end, and includes the engaging concave portion 83 having a concave shape disposed on the outer periphery at the distal end of the shaft portion 81. The engaging convex portions 71 and 71 of the engaging cylinder portion 70 of the valve main body 60 are arranged to engage the engaging concave portion 83 (see FIG. 9). The engaging concave portion 83 and the engaging convex portions 71 define the "engaging portion" arranged to make the shaft portion 81 engage the back surface of the shaft insertion hole 67 in the present invention. Examples of the "engaging portion" may include a shaft portion and an engaging cylinder portion in which thread grooves are formed on the outer periphery of the shaft portion and the inner periphery of the engaging cylinder portion, and the shaft portion is screwed into the engaging cylinder portion, or may include a shaft portion and an engaging cylinder portion in which a convex portion is provided to the shaft portion and a concave portion is provided to the engaging cylinder portion, and the "engaging portion" is not limited specifically.

The presser portion 85 includes a ceiling portion 86 having an approximately circular shape of which the inner surface side (back side) is coupled together with the shaft portion 81, and the outer surface side (right side) is provided with a cutout concave portion in its center, and an umbrella portion 87 expanding like an umbrella obliquely to the outside toward the distal end side of the shaft portion 81 from the peripheral edge of the ceiling portion 86. A distal end portion 87a of the umbrella portion 87 extends in parallel in the shaft direction of the shaft portion 81. The inclined shape of the umbrella portion 87 matches the inclined shape of the cylinder body 31 of the case main body 30 (see FIG. 4).

Plural communicating holes 88 having a long hole shape are provided to the umbrella portion 87 and the ceiling portion 86 partly on their peripheral edges at regular intervals along the circumferential direction. An increased diameter step portion 86a is provided on the outer periphery at the base end of the shaft portion 81 on the inner surface side (back side) of the ceiling portion 86 (see FIG. 3B).

As shown in FIG. 7 and FIG. 8, the shaft portion 81 of the presser cap 80 is inserted into the shaft insertion hole 67 of the valve main body 60, and the engaging convex portions 71 and 71 of the engaging cylinder portion 70 are made to engage the engaging concave portion 83 in a state where the ring sealing member 75 is mounted on the first mount surface 65 of the valve main body 60 and the negative pressure valve 55 is mounted on the second mount surface 66, whereby the thick portion 75a of the ring sealing member 75 is sandwiched between the distal end portion 87a of the umbrella portion 87 and the first mount surface 65 while the thick portion 55a of the negative pressure valve 55 is sandwiched between the increased diameter step portion 86a on the back side of the ceiling portion and the second mount surface 66, and thus the presser cap 80 is mounted on the positive pressure valve 50 (see FIG. 9).

Before the presser cap 80 is mounted on the positive pressure valve 50, the thin portion 55b having a thin lip shape of the negative pressure valve 55 is not deformed by being bent in this state (see FIG. 8). On the other hand, in a state where the presser cap 80 is mounted on the positive pressure valve 50, the thick portion 55a of the negative pressure valve 55 is slightly pressed and crushed to be sandwiched between the second mount surface 66 of the valve main body 60 and the increased diameter step portion 86a of the cap 80, whereby the thin portion 55b is slightly bent and deformed so as to roll back, and thus the outer peripheral edge of the thin portion 55b is brought into elastic contact with the negative pressure valve seat 69.

The present embodiment exemplifies the structure in which the distal end portion 87a of the umbrella portion 87 of the presser cap 80, the increased diameter step portion 86a on the back side of the ceiling portion 86, and the first mount surface 65 and the second mount surface 66 of the valve main body 60 sandwich the ring sealing member 75 and the negative pressure valve 55. However, the manner of sandwiching the ring sealing member 75 and the negative pressure valve 55 is not limited to this structure.

Next, the action and effect of the above-described check valve 10 will be described.

First, assembling operation of the ring sealing member 75 and the negative pressure valve 55 to the valve main body 60 of the positive pressure valve 50 will be described with reference to FIGS. 7 to 9.

First, as shown in FIG. 7, the thick portion 75a of the ring sealing member 75 is mounted on the first mount surface 65 by inserting the base portion 61 of the valve main body 60 into the inner periphery of the thick portion 75a of the ring sealing member 75 while the ring convex portion 65a is brought into contact with the back surface of the thin portion 75b of the ring sealing member 75. Thus, the thin portion 75b is disposed so as to be apart from the first mount surface 65 with a predetermined gap therebetween.

The inner center of the thick portion 55a of the negative pressure valve 55 is made to match the shaft insertion hole 67 of the valve main body 60 to mount the thick portion 55a of the negative pressure valve 55 on the second mount surface 66 while the thin portion 55b of the negative pressure valve 55 is brought into contact with the negative pressure valve seat 69. In this state, the ring sealing member 75 and the negative pressure valve 55 made from an elastic resin material are mounted so as to have a double ring shape.

As shown in FIG. 8, the shaft portion 81 of the presser cap 80 is inserted into the shaft insertion hole 67 of the valve main body 60 from the above-described state, and the presser cap 80 is pushed into the valve main body 60. Then, the engaging convex portions 71 and 71 of the engaging cylinder portion 70 of the valve main body 60 are pressed to the distal end portion of the shaft portion 81 of the presser cap 80, the engaging cylinder portion 70 is bent and deformed outward so as to increase in diameter, the presser cap 80 is further pushed in, and when the engaging convex portions 71 and 71 reach the engaging concave portion 83 of the shaft portion 81, the engaging cylinder portion 70 flexibly returns and the engaging convex portions 71 and 71 engage the engaging concave portion 83, and the shaft portion 81 engages the back surface of the shaft insertion hole 67. At the same time, the thick portion 75a of the ring sealing member 75 is sandwiched between the distal end portion 87a of the umbrella portion 87 of the presser cap 80 and the first mount surface 65 of the positive pressure valve 50 while the thick portion 55a of the negative pressure valve 55 is sandwiched between the increased diameter step portion 86a on the back side of the ceiling portion of the presser cap 80 and the second mount surface 66 of the positive pressure valve 50, and thus the presser cap 80 is mounted on the positive pressure valve 50 while retained (see FIG. 9).

As described above, in the check valve 10, with the easy operation of only inserting the shaft portion 81 of the presser cap 80 into the shaft insertion hole 67 of the valve main body 60 and pushing in the presser cap 80 in a state where the ring sealing member 75 is mounted on the first mount surface 65 of the valve main body 60 and the negative pressure valve 55 is mounted on the second mount surface 66, the ring sealing member 75 and the negative pressure valve 55 are sandwiched at the same time with the mount surfaces 65 and 66 as shown in FIG. 9. Thus, the ring sealing member 75 and the negative pressure valve 55 can be assembled smoothly and easily to the valve main body 60 of the positive pressure valve 50, and the assembly workability of the ring sealing member 75 and the negative pressure valve 55 with respect to the valve main body 60 can be improved.

In the present embodiment, the shaft insertion hole 67 is provided in the center of the second mount surface 66 of the valve main body 60, the negative pressure valve 55 has a ring shape, the presser cap 80 includes the shaft portion 81 inserted into the shaft insertion hole 67, the presser portion 85 provided on the outer periphery at the base end of the shaft portion 81 and arranged to sandwich the ring sealing member 75 and the negative pressure valve 55 with the first mount surface 65 and the second mount surface 66, and the engaging portion arranged to make the shaft portion 81 engage the back surface of the shaft insertion hole 67.

Thus, with the easy operation of only inserting the shaft portion 81 of the presser cap 80 into the shaft insertion hole 67 of the valve main body 60 and making the shaft portion 81 engage the back surface of the shaft insertion hole 67 with the use of the engaging portion (the engaging convex portions 71 of the engaging cylinder portion 70 and the engaging concave portion 83 of the shaft portion 81) in a state where the ring sealing member 75 and the negative pressure valve 55 are mounted on both the mount surfaces 65 and 66 of the valve main body 60, the ring sealing member 75 and the negative pressure valve 55 can be assembled to the valve main body 60 of the positive pressure valve 50, which can improve the assembly workability.

In the present embodiment, because the thick portions 75a and 55a are provided to the ring sealing member 75 and the negative pressure valve 55 respectively, and the thick portions 75a and 55a are sandwiched with the mount surfaces 65 and 66 of the valve main body 60 and the presser cap 80 as described above, the ring sealing member 75 and the negative pressure valve 55 can be held reliably.

The positive pressure valve 50 prepared by assembling the ring sealing member 75 and the negative pressure valve 55 as described above is disposed in the valve chamber V of the valve case 20. The check valve 10 including these elements is mounted inside or outside of a fuel tank using a clip, a bracket or the like (not illustrated) in a state where a pipe that is disposed in the fuel tank and coupled together with a cut valve or the like is connected with the first connection portion 33 of the case main body 30 while a pipe that is coupled together with a canister or the like disposed outside of the fuel tank is connected with the second connection portion 43 of the sub case 40.

When the pressure inside the fuel tank does not reach the positive-pressure threshold, the thin portion 75b of the ring sealing member 75 of the positive pressure valve 50 urged by the urging force of the spring 53 is brought into elastic contact with the positive pressure valve seat 37 to close the opening on the inner side of the positive pressure valve seat 37 while the thin portion 55b of the negative pressure valve 55 is slightly bent and deformed so as to curl up (FIG. 9), and thus the outer peripheral edge of the thin portion 55b is brought into elastic contact with the negative pressure valve seat 69, whereby the plural penetrating passages 68 are closed as shown in FIG. 4.

When the pressure inside the fuel tank rises to the positive-pressure threshold or higher from the above-described state, the fuel vapor or the like flows into the valve chamber V through the inside of the first connection portion 33 to press the positive pressure valve 50, the positive pressure valve 50 slides toward the sub case 40 against the urging force of the spring 53, the thin portion 75b of the ring sealing member 75 of the positive pressure valve 50 moves away from the positive pressure valve seat 37, and the opening on the inner side of the thin portion 75b opens as shown in FIG. 5. Then, as indicated by the arrows in FIG. 5, the fuel vapor flows between the inner periphery of the case main body 30 and the outer periphery of the positive pressure valve 50 while passing through the window portions 63a of the frame-shaped wall 63, passing between the plural ribs 47 of the sub case 40 to flow into the opening portion 42 of the sub case 40, and being sent to a canister or the like via the inside of the second connection portion 43 and a pipe (not illustrated). In this way, the fuel vapor is discharged to the outside of the fuel tank, whereby the pressure inside the fuel tank can be lowered.

At this time, in the check valve 10, the thin portion 75b having a thin lip shape of the ring sealing member 75 made from an elastic resin material that is mounted on the first mount surface 65 of the valve main body 60 of the positive pressure valve 50 is brought into contact with to seal the positive pressure valve seat 37, which can improve the sealing property of the positive pressure valve 50 with respect to the positive pressure valve seat 37 as compared with a case where a valve member made from a synthetic resin is brought into contact with a positive pressure valve seat.

In the present embodiment, because a predetermined gap is provided between the thin portion 75b of the ring sealing member 75 and the first mount surface 65 of the valve main body 60 in a state where the ring sealing member 75 is sandwiched between the valve main body 60 and the presser cap 80 as shown in FIG. 4 and FIG. 9, dimensional variations of the ring sealing member 75 and the first mount surface 65 can be absorbed by this gap, which can more improve the sealing property of the positive pressure valve 50 during the time when the positive pressure valve 50 is closed.

In the present embodiment, because the thin portion 75b is supported while the gap between the thin portion 75b of the ring sealing member 75 and the first mount surface 65 of the positive pressure valve 50 is maintained by bringing the ring convex portion 65a provided on the first mount surface 65 of the valve main body 60 into contact with the thin portion 75b of the ring sealing member 75 as shown in FIG. 4, the elastic force of the thin portion 75b can be improved when the thin portion 75b of the ring sealing member 75 is brought into contact with the positive pressure valve seat 37, which can more improve the sealing property of the positive pressure valve 50 during the time when the positive pressure valve 50 is closed.

In the present embodiment, because the negative pressure valve seat 69 provided to the positive pressure valve 50 is made of the rib having a ring shape and surrounding the opening portions of the plural penetrating passages 68 on the fuel tank side on the second mount surface 66 of the valve main body 60 (see FIG. 2A), the thin portion 55b having a thin lip shape of the negative pressure valve 55 is brought into contact with the negative pressure valve seat 69 in the state of being slightly bent and deformed so as to roll back as shown in FIG. 9, which can improve the sealing property of the negative pressure valve 55 with respect to the negative pressure valve seat 69.

Figure 6:
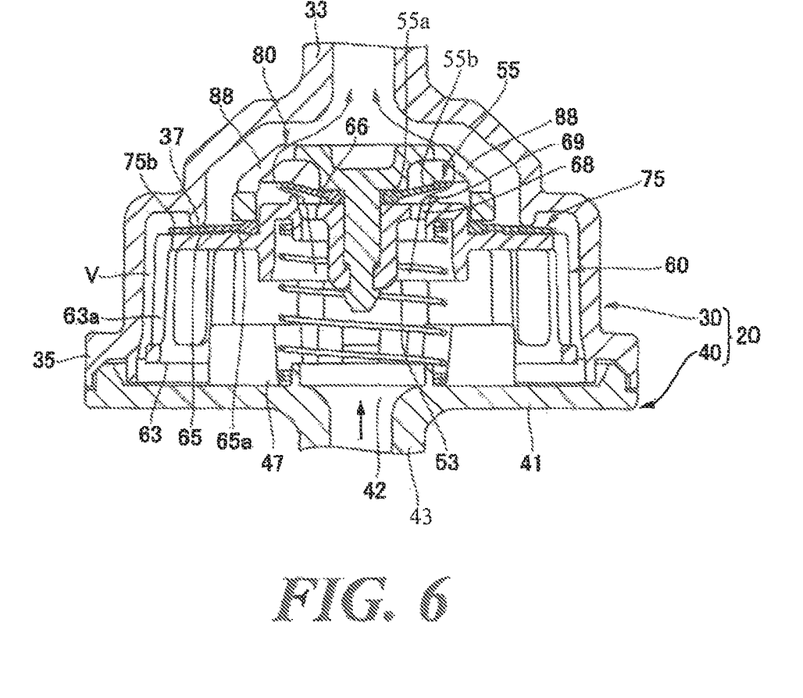
FIG. 6 is an enlarged cross-sectional view of the check valve showing a relevant part in a state where the pressure within the fuel tank drops to a negative-pressure threshold or lower.

When the pressure inside the fuel tank drops to the negative-pressure threshold or lower than the atmospheric pressure, outside air is introduced into the valve chamber V from the opening portion 42 through the inside of the second connection portion 43 of the sub case 40. The outside air flows inside of the spring 53 to pass through the plural penetrating passages 68, whereby the thin portion 55b of the negative pressure valve 55 is pressed to be bent and deformed so as to curl up and moves away from the negative pressure valve seat 69 of the valve main body 60 as shown in FIG. 6. Then, as indicated by the arrows in FIG. 6, the outside air passes through the plural penetrating passages 68 and the plural communicating holes 88 of the presser cap 80, and passes between the outer periphery of the case main body 30 and the outer periphery of the cap 80 to flow into the first connection portion 33 to be sent to the inside of the fuel tank via a pipe (not illustrated), whereby the pressure inside the fuel tank can be made to rise.

Figure 10:
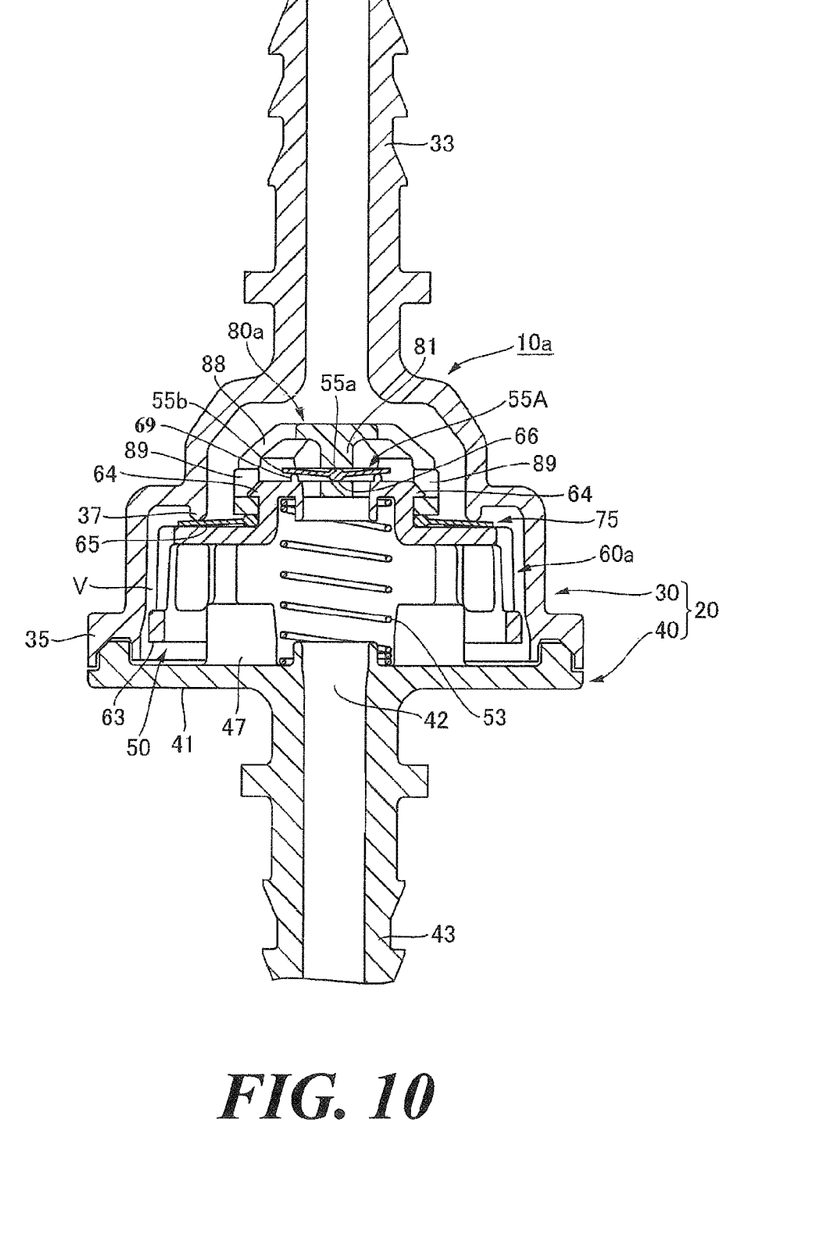
FIG. 10 is a cross-sectional view of a check valve according to another embodiment.

In FIG. 10, a check valve according to another embodiment of the present invention is shown. The same reference numerals are provided to the constituent elements that are substantially same as those in the above-described embodiment, and explanations of these constituent elements are omitted.

As shown in FIG. 10, a check valve 10a according to the present embodiment is different from the above-described embodiment in a mounting structure of a presser cap 80a on a valve main body 60a.

To be specific, the valve main body 60a of the present embodiment includes an engagement pawl 64 including a tapered surface as a top surface that protrudes from the opposed position on the outer periphery of the ceiling wall 61b of the base portion 61. The shaft insertion hole 67 as in the above-described embodiment is not provided in the center portion of the ceiling wall 61b of the base portion 61 of the valve main body 60a, and the center portion of the ceiling wall 61b forms the second mount surface 66. A negative pressure valve 55A having an approximately disk shape includes a thick portion 55a in its center and a thin portion 55b disposed on the outer periphery of the thick portion 55a, and the thick portion 55a is mounted on the second mount surface 66.

The presser cap 80a includes an engagement hole 89 that the engagement pawl 64 engages on the side of the distal end portion 87a of the umbrella portion 87. The shaft portion 81 is shorter as compared with the above-described embodiment, and the thick portion 55a of the negative pressure valve 55A mounted on the first mount surface 65 is sandwiched with the distal end portion of the shaft portion 81.

Thus, in the check valve 10a according to the present embodiment, by pushing the presser cap 80a into the valve main body 60a in a state where the ring sealing member 75 is mounted on the first mount surface 65 of the valve main body 60a and the negative pressure valve 55A is mounted on the second mount surface 66, the engagement pawl 64 of the valve main body 60a engages the engagement hole 89 of the presser cap 80s, and the ring sealing member 75 and the negative pressure valve 55A are sandwiched at the same time with the mount surfaces 65 and 66, and thus the ring sealing member 75 and the negative pressure valve 55A can be easily assembled to the valve main body 60a of the positive pressure valve 50.

The invention claimed is:
1. A check valve including:
   a valve case including:
     a first connection portion connectable with a pipe communicating with a fuel tank;
     a second connection portion connectable with a pipe communicating with a canister disposed outside of the fuel tank;
     a valve chamber defined in an interior of the valve case; and
     a positive pressure valve seat formed at a portion within a range from the valve chamber to the first connection portion;
   a positive pressure valve slidably disposed in the valve chamber so as to close or open the positive pressure valve seat, the positive pressure valve including:

a penetrating passage penetrating inside the positive pressure valve; and a negative pressure valve seat disposed around an opening portion of the penetrating passage at a side of the first connection portion;

a spring disposed in the valve case, and arranged to urge the positive pressure valve so as to be brought into contact with the positive pressure valve seat, and to be compressed so as to open the positive pressure valve from the positive pressure valve seat when a pressure at the side of the first connection portion rises to a positive-pressure threshold or higher; and a negative pressure valve made from an elastic resin material, assembled to the positive pressure valve, and arranged to be brought into elastic contact with the negative pressure valve seat so as to close the penetrating passage in a normal state, and to open the penetrating passage when the pressure at the side of the first connection portion drops to a negative-pressure threshold or lower, wherein the positive pressure valve includes;
a valve main body; and
a ring sealing member assembled to the valve main body, made from an elastic resin material, and arranged to close or open the positive pressure valve seat, wherein the valve main body includes:
a first mount surface on which the ring sealing member is mounted; and
a second mount surface which is disposed on an inner diameter side of the first mount surface, on which the negative pressure valve seat is formed, and on which the negative pressure valve is mounted, and wherein a presser cap is further mounted on the positive pressure valve, so that the presser cap sandwiches the ring sealing member with the first mount surface of the valve main body and pinches the negative pressure valve to the second mount surface of the valve main body.

2. The check valve of claim 1,
wherein the second mount surface of the valve main body includes a shaft insertion hole in its center,
wherein the negative pressure valve has a ring shape, and
wherein the presser cap includes;
a shaft portion inserted into the shaft insertion hole;
a presser portion disposed on an outer periphery of a base end of the shaft portion, and arranged to sandwich the ring sealing member and the negative pressure valve with the first mount surface and the second mount surface, respectively; and
an engaging portion arranged to engage the shaft portion with a back surface of the shaft insertion hole.

3. The check valve of claim 2,
wherein each of the ring sealing member and the negative pressure valve includes;
a thick portion on its inner periphery side; and
a thin portion on its outer diameter side than the thick portion, the thin portion being thinner than the thick portions,
wherein the presser cap is arranged to sandwich the thick portion of the ring sealing member and the thick portion the negative pressure valve with the first mount surface and the second mount surface of the valve main body, and
wherein a predetermined gap is defined between the thin portion of the ring sealing member and the first mount surface of the valve main body in a state where the positive pressure valve slides against an urging force of the spring and the positive pressure valve seat is opened.

4. The check valve of claim 3,
wherein a ring convex portion is formed on the first mount surface such that the ring convex portion is brought into contact with the thin portion of the ring sealing member, thereby supporting the thin portion of the ring sealing member with the predetermined gap from the first mount surface of the valve main body.

5. The check valve of claim 1,
wherein the negative pressure valve seat includes a ring rib formed on the second mount surface of the valve main body so as to surround the opening portion of the penetrating passage at the side of the first connection portion.

6. The check valve of claim 1, wherein, in the normal state, the ring sealing member of the positive pressure valve is brought into contact with the positive pressure valve seat by the spring and the negative pressure valve is brought into contact with the negative pressure valve seat to close the penetrating passage communicating the inside of the fuel tank with an outside, and the positive pressure valve slides against an urging force of the spring to move away from the positive pressure valve seat when the pressure inside the fuel tank is greater than or equal to the positive-pressure threshold value.

7. The check valve of claim 1, wherein, in the normal state, fuel vapor in the tank is discharged through the positive pressure valve seat.

8. The check valve of claim 1, wherein, in the normal state, air outside of the fuel tank flows into the fuel tank through the negative pressure valve seat when the pressure inside the fuel tank is less than or equal to the negative-pressure threshold.

9. The check valve of claim 1, wherein the presser cap includes an umbrella portion that extends obliquely from a center of the presser cap and downwardly to distal end portions, and
wherein the ring sealing member is sandwiched between the distal end portions of the umbrella portion and the first mount surface.

10. The check valve of claim 1, wherein the valve main body of the positive pressure valve includes:
a base portion; and
a peripheral wall having a cylindrical shape,
wherein the presser cap includes an umbrella portion that extends obliquely from a center of the presser cap and downwardly to distal end portions, and
wherein the distal end portions of the umbrella portion surround the peripheral wall of the valve main body.

11. A check valve including:
a valve case including:
a first connection portion connectable with a pipe communicating with a fuel tank;
a second connection portion connectable with a pipe communicating with a canister disposed outside of the fuel tank;
a valve chamber defined in an interior of the valve case; and
a positive pressure valve seat formed at a portion within a range from the valve chamber to the first connection portion;
a positive pressure valve slidably disposed in the valve chamber so as to close or open the positive pressure valve seat, the positive pressure valve including:

a penetrating passage penetrating inside the positive pressure valve; and a negative pressure valve seat disposed around an opening portion of the penetrating passage at a side of the first connection portion;

a spring disposed in the valve case, and arranged to urge the positive pressure valve so as to be brought into contact with the positive pressure valve seat, and to be compressed so as to open the positive pressure valve from the positive pressure valve seat when a pressure at the side of the first connection portion rises to a positive-pressure threshold or higher; and a negative pressure valve made from an elastic resin material, assembled to the positive pressure valve, and arranged to be brought into elastic contact with the negative pressure valve seat so as to close the penetrating passage in a normal state, and to open the penetrating passage when the pressure at the side of the first connection portion drops to a negative-pressure threshold or lower, wherein the positive pressure valve includes:

a valve main body; and a ring sealing member assembled to the valve main body, made from an elastic resin material, and arranged to close or open the positive pressure valve seat, wherein the valve main body includes:

a first mount surface on which the ring sealing member is mounted; and a second mount surface which is disposed on an inner diameter side of the first mount surface, on which the negative pressure valve seat is formed, and on which the negative pressure valve is mounted, and wherein a presser cap is further mounted on the positive pressure valve, so that the presser cap sandwiches the ring sealing member with the first mount surface of the valve main body and sandwiches the negative pressure valve with the second mount surface of the valve main body, wherein the second mount surface of the valve main body includes a shaft insertion hole in its center, wherein the negative pressure valve has a ring shape, and wherein the presser cap includes:

a shaft portion inserted into the shaft insertion hole;

a presser portion disposed on an outer periphery of a base end of the shaft portion, and arranged to sandwich the ring sealing member and the negative pressure valve with the first mount surface and the second mount surface, respectively; and an engaging portion arranged to engage the shaft portion with a back surface of the shaft insertion hole.

* * * * *